(12) United States Patent
Chang et al.

(10) Patent No.: US 8,073,191 B2
(45) Date of Patent: Dec. 6, 2011

(54) METHOD AND SYSTEM FOR CORRECTING BUTTING ARTIFACTS IN X-RAY IMAGES

(75) Inventors: Ti-chiun Chang, Princeton Junction, NJ (US); Yunqiang Chen, Plainsboro, NJ (US); Tong Fang, Morganville, NJ (US); Sandra Martin, Herzogenaurauch (DE); Stefan Böhm, Oberasbach (DE); Peter Durlak, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 755 days.

(21) Appl. No.: 12/283,357

(22) Filed: Sep. 11, 2008

(65) Prior Publication Data

US 2009/0080756 A1    Mar. 26, 2009

Related U.S. Application Data

(60) Provisional application No. 60/974,970, filed on Sep. 25, 2007.

(51) Int. Cl.
*G06K 9/00*        (2006.01)
(52) U.S. Cl. ..................................................... 382/100
(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| 7,372,017 | B2 | 5/2008 | Hörnig |
| 2007/0007447 | A1 | 1/2007 | Spahn |
| 2007/0057170 | A1 | 3/2007 | Hornig |

OTHER PUBLICATIONS

H. Qi, et al., "Missing Data Estimation by Separable Deblurring", Proc. for the IEEE Int'l Joint Symposia on Intelligence and Systems, pp. 348-353, May 1998.
H. Qi, et al., "Conditioning Analysis of Missing Data Estimation for Large Sensor Arrays", IEEE Int'l Conf. on Comp. Vision & Pattern Recognition, v2, pp. 565-570, Jun. 2000.

*Primary Examiner* — Atiba O Fitzpatrick

(57) ABSTRACT

A method and system for correcting butting artifacts in x-ray images is disclosed. In order to correct a butting artifact in an x-ray image, a butting artifact region in the x-ray image is normalized. Multiple intensity shift estimators are calculated for each pixel of each line of the butting artifact. Confidence intervals are calculated for each intensity shift estimator. A multiple hypothesis hidden Markov model (MH-HMM) is formulated based on the intensity shift operators and confidence measures subject to a smoothness constraint, and the MH-HMM is solved to determine intensity shift values for each pixel. A corrected image is generated by adjusting the intensity of each pixel of the butting artifact based on the intensity shift value for that pixel.

25 Claims, 7 Drawing Sheets

STEP 502 – INITIALIZATION for i=1:N
    $\delta_1(i) = P_i(s_0(1,h))$;    % $P_i(s_0(1,h))$ IS THE PROBABILITY OF THE FIRST OBSERVATION
                                 % BEING s(1, h) GIVEN THE FIRST PIXEL BEING AT STATE i,
                                 % COMPUTED ACCORDING TO THE DISTRIBUTION MODEL (FIG. 4).
    $\Phi_1(i) = 0$;     % $\Phi_x(i)$ DENOTES THE MOST LIKELY STATE FOR THE PREVIOUS
                    % PIXEL (x-1) GIVEN THAT THE CURRENT PIXEL (x) IS AT STATE i
                    % $\delta_x(i)$ IS THE MAXIMUM PROBABILITY OF PIXEL x AT STATE i
                    % GIVEN THE PREVIOUS PATH

STEP 504 – RECURSION

FOR x=2:T
        FOR j=1:N
            $\delta_x(j) = \max[\delta_{x-1}(i)\, a_{ij}]\, \max\{P_j(s_k(x,h)) * \chi_k(x)\}$, FOR ALL
    STATE i AND ALL ESTIMATES $s_k(x,h)$
            $\Phi_x(j) = \mathrm{argmax}[\delta_{x-1}(i)\, a_{ij}]$, FOR ALL STATE i % $a_{ij}$ IS THE TRANSITION PROBABILITY FROM STATE i TO STATE j, COMPUTED ACCORDING TO EQ. (8)

STEP 506 – OPTIMAL SOLUTION (max a POSTERIORi)

$P^* = \max[\delta_T(i)]$, FOR ALL STATE i
    $s^*(T,h) = \mathrm{argmax}[\delta_T(i)]$, FOR ALL STATE i

STEP 508 – PATH (STATE SEQUENCE) BACKTRACKING

FOR x=T-1:-1:1
        $s^*(x,h) = \Phi_{x+1}(s^*(x+1,h))$

FIG. 5

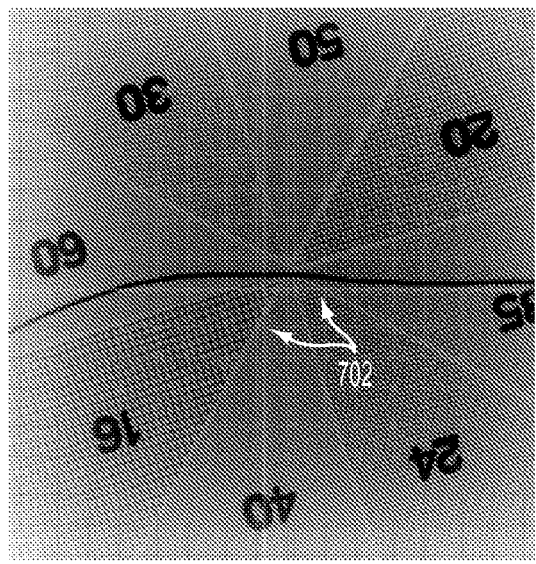
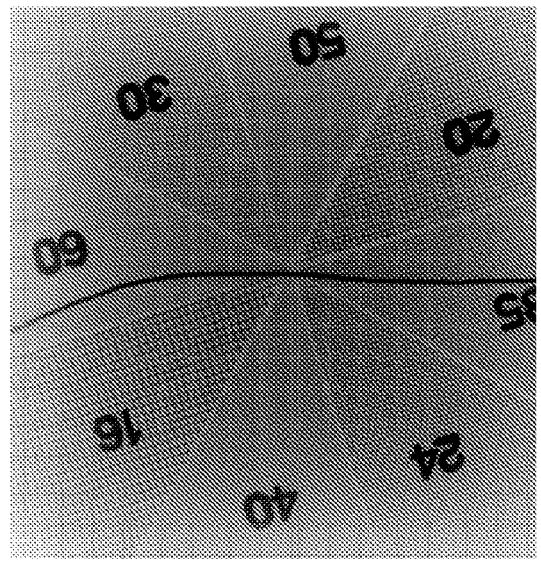
FIG. 7A
FIG. 7B
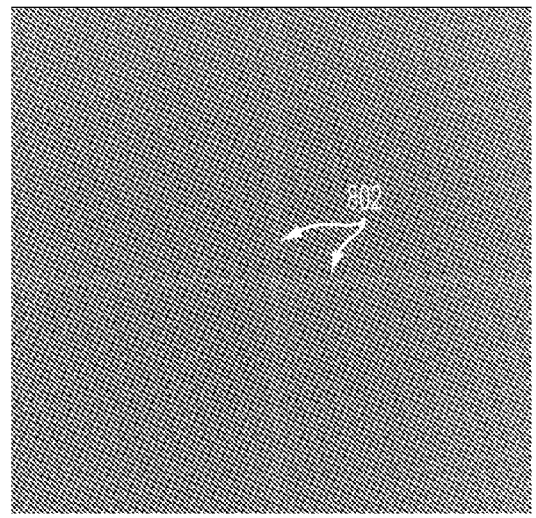
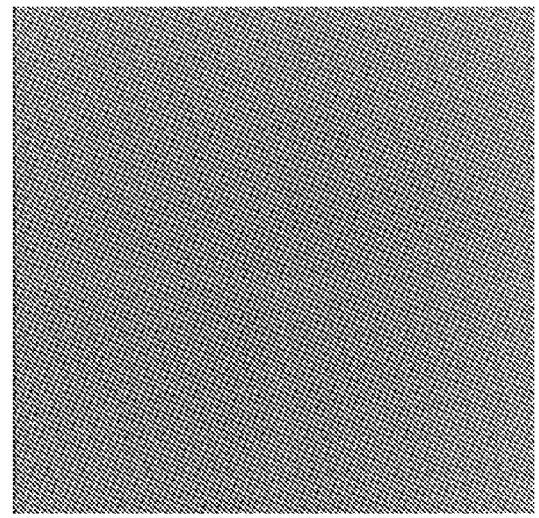
FIG. 8A
FIG. 8B

METHOD AND SYSTEM FOR CORRECTING BUTTING ARTIFACTS IN X-RAY IMAGES

This application claims the benefit of U.S. Provisional Application No. 60/974,970, filed Sep. 25, 2007, the disclosure of which is herein incorporated by reference.

BACKGROUND OF THE INVENTION

The present invention relates to artifact correction in X-ray images, and more particularly, a method and system for correcting butting artifacts in X-ray images.

In order to generate X-ray images, digital imaging systems often utilize flat detectors. In such digital imaging systems, an X-ray source and a flat detector are positioned on opposite sides of patient's body. X-rays are generated by an X-ray source, pass through the patient's body, and hit the flat detector, which generates a digital image of the patient's body. Butting refers to a technique that combines multiple detectors side by side in order to image a large area when a detector large enough to image the area is not available or is too expensive. A butting line where two detectors are joined together typically results in missing or corrupted data in the output X-ray images. In medical X-ray imaging, four detectors are often joined together and arranged as a 2×2 matrix. Accordingly, butting artifacts resulting from such an arrangement are typically seen as a cross shape, thus referred to as a butting cross.

Depending on the digital imaging systems, the butting artifacts can appear as missing data or distortion of the image intensities. In either case, important medical information can be biased in X-ray images, making the use of such X-ray images for diagnostic purposes difficult. It is therefore critical to accurately correct such butting artifacts in X-ray images.

BRIEF SUMMARY OF THE INVENTION

The present invention provides a method for correcting butting artifacts in X-ray images. Embodiments of the present invention utilize a fully automatic butting artifact correction method based on a multiple hypothesis hidden Markov model (MH-HMM). This butting artifact correction method can correct butting artifacts having multiple lines of pixels.

In one embodiment of the present invention, an x-ray image having a butting artifact is received. Multiple intensity shift estimators are calculated for each pixel of each line of the butting artifact. Confidence measures are calculated for each intensity shift estimator. Intensity shift values are determined for each pixel of each line of the butting artifact using an MH-HMM formulated based on the intensity shift operators and confidence measures subject to a smoothness constraint. A corrected image is generated by adjusting the intensity of each pixel of each line of the butting artifact based on the intensity shift value for that pixel. A butting artifact region in the x-ray image may be normalized before calculating the intensity shift estimators, and the artifact region of the corrected image may be inversely normalized.

These and other advantages of the invention will be apparent to those of ordinary skill in the art by reference to the following detailed description and the accompanying drawings.

BRIEF DESCRIPTION OF THE DRAWINGS

FIG. 5 illustrates pseudo-code for using the Viterbi algorithm to solve the MH-HMM;

FIGS. 7 and 8 illustrate exemplary butting cross artifact correction results using the method of FIG. 1.

DETAILED DESCRIPTION

Figure 1:
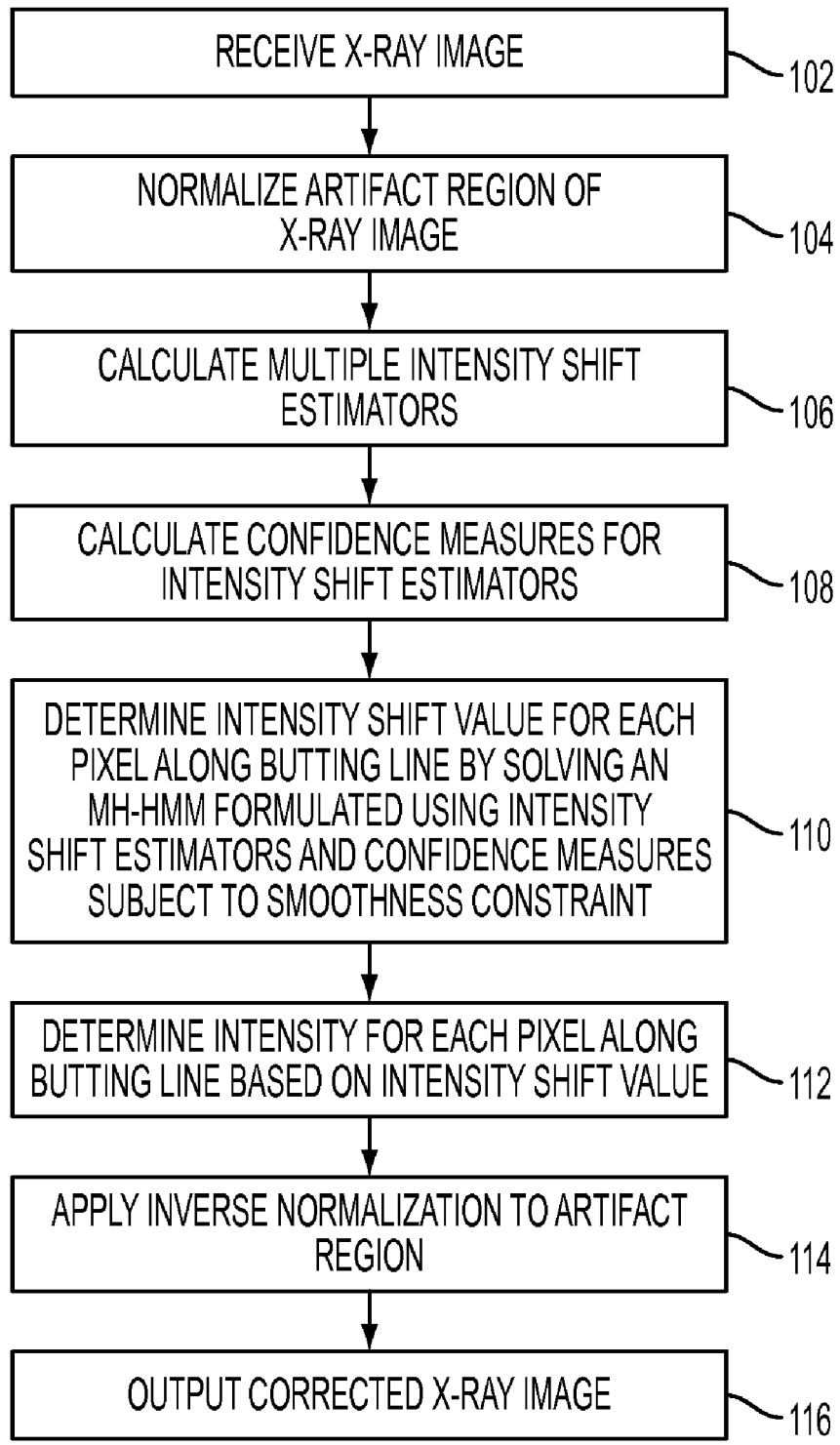
FIG. 1 illustrates a method of correcting a butting artifact in an X-ray image according to an embodiment of the present invention.

The present invention is directed to a method for butting artifact correction in X-ray images. Embodiments of the present invention are described herein to give a visual understanding of the butting artifact correction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments of the present invention estimate an intensity shift along butting lines in an X-ray image based on the image information. Since the unknown intensity shift along the butting lines should be mostly smooth (such that intensity shifts for consecutive pixels are not very different from each other), a hidden Markov model (HMM) can be used to impose a smoothness constraint on the estimated intensity shifts. Furthermore, since a single intensity shift is not likely to suitably handle different types of image structures and textures, multiple estimators can be used to construct a multiple hypothesis HMM (MH-HMM). The Viterbi algorithm can be used to solve the MH-HMM to determine the likely solution for the intensity shift values along the path of the butting lines.

Butting artifacts are commonly formed in the shape of a cross in X-ray images. Horizontal and vertical butting artifacts have essential the same characteristics. Accordingly, embodiments of the present invention describe correcting horizontal artifacts. It is to be understood that such embodiments can be similarly applied to vertical artifacts as well. As the positions of the butting artifacts are fixed in an X-ray image, a butting line in image f(x,y) can be denoted as f(x,h), where h is the index for an artifact line. A butting artifact may contain multiple butting lines.

To validate if the information in the butting cross regions is completely missing or just slightly interfered, the smoothed profiles $f_s(x,h)$ and $f_s(x,n)$ and their difference $d_s(x)=f_s(x,h)-f_s(x,n)$ can be observed, where n is the index for an artifact-free line that is closest to the butting line f(x,h). The difference $d_s(x)$ is generally smooth in the x direction. Thus, the information in the butting lines is only corrupted but not missing. As a result, a smoothing constraint as described in greater detail below. Based on these observations, a model for formation of a corrected image can be formulated as:

$$f(x,h)=f_{true}(x,h)+s(x,h), \qquad (1)$$

where f(x,h) is the observed intensity value along the butting line, $f_{true}(x,h)$ is the unknown true intensity value along the butting line, and s(x,h) is the unknown intensity shift to be estimated. Once s(x,h) is known, the true intensity $f_{true}$(x,h) can be obtained for each pixel along the butting line by subtracting s(x,h) from the input f(x,h).

FIG. 1 illustrates a method of correcting a butting artifact in an X-ray image according to an embodiment of the present invention. At step 102, an X-ray image is received. The X-ray image can be generated by a digital imaging system having using multiple flat detectors. Accordingly, the X-ray may have butting artifacts resulting from the butting of the multiple flat detectors. For example, the X-ray image can be generated using four detectors arranged in a 2×2 matrix resulting in a butting cross. The X-ray image may be received directly from a digital imaging system or may be loaded, for example from a memory, storage, or other computer readable medium of a computer system.

At step 104, the artifact region of the X-ray image is normalized. Because medical X-ray images may have a high dynamic range and the intensity distortion resulting from the butting procedure depends on intensity, the image is normalized locally around the butting region in order to reduce the number of required states (intensity values) in the hidden Markov model (HMM). The normalized image $f_n$(x,y) can be written as $$f_n(x, y) = f(x, y) \Big/ \underset{x}{\mathrm{median}}\{(\bar{f}(x, [h-w, h+w]))\}, \qquad (2)$$

where $\bar{f}$(x,[h−w,h+w]) denotes the median in the y direction with a window size 2w, and median represents a median filter along the x direction. Therefore, for each pixel, the normalization factor is determined by first taking the median in the y direction and then another median in the x direction.

At step 106, multiple intensity shift estimators are calculated. Each intensity shift estimator calculates an estimate of the intensity shift value for each pixel of a butting line based on the normalized image. Because butting artifacts can be intermingled with noise and various types of image structures in the X-ray image, it is difficult to use a single intensity shift estimator to correct for the butting artifact. Accordingly, multiple intensity shift estimators can be used in order to take different types of image structures into account. Described herein are exemplary intensity shift estimators used in the method of FIG. 1. It is to be understood that alternate or additional intensity shift estimators can be used as well.

If there is no noise and image structure in the X-ray image (i.e., the image has a constant intensity except for the butting region), the desired intensity shift can be calculated as f(x, h)−f(x,n), and the resulting output $f_{true}$(x,h) is then equal to f(x,n). In order handle the case where structures are aligned with one side of the butting region, f(x,h), f(x,$n_u$), and f(x,$n_d$) can be smoothed using a median filter to obtain, $f_s$(x,h), $f_s$(x, $n_u$), and $f_s$(x, $n_d$), respectively, where $n_u$ and $n_d$ denote the neighboring line indices above and below line h, respectively. Based on the smoothed butting region, first and second intensity shift estimators are calculated as:

$$s_1(x,h)=f_s(x,h)-f_s(x,n_u); \text{ and} \qquad (3)$$

$$s_2(x,h)=f_s(x,h)-f_s(x,n_d). \qquad (4)$$

In order to better account for noise and cases in which the intensity changes smoothly across the butting region, a third intensity shift estimator is the interpolated values between $f_s$(x, $n_u$) and $f_s$(x, $n_d$), expressed as:

$$s_3(x,h)=f_s(x,h)-f_{int}(x,h), \text{ where}$$

$$f_{int}(x,h)=[d(h,n_d)f_s(x,n_u)+d(h,n_u)f_s(x,n_d)]/(d(h,n_d)+d(h,n_u)). \qquad (5)$$

Here, $d(y_1,y_2)$ is the distance between $y_1$ and $y_2$.

Figure 2:
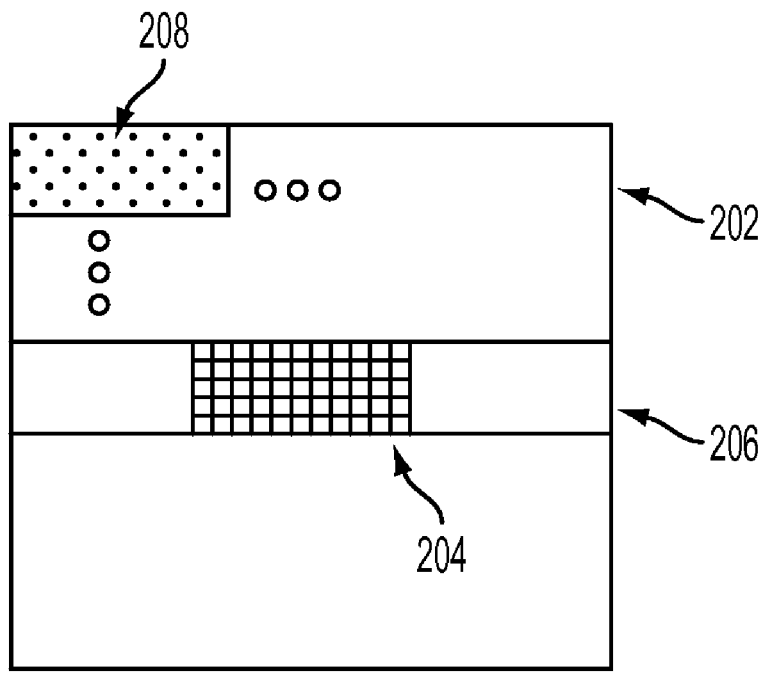
FIG. 2 illustrates a similarity based intensity shift estimator.

The first, second, and third estimators work well when there are relatively few interfering structures in the butting region. However, if the butting artifact region is highly textured, an additional intensity shift estimator may be needed to compensate for the shortcomings of the first, second, and third intensity shift estimators. Accordingly, a similarity base estimator can be used as a fourth intensity shift estimator. FIG. 2 illustrates a similarity based intensity shift estimator. As illustrated in FIG. 2, a search window 202 defines a neighborhood to search for the best match as compared to a template window T 204 inside the butting region 206. A sliding window S 208 within the search window 202 is compared to the template window T 204 to find the best match within the search window 202. For the comparison between the sliding window S 208 and the template window T 204, the following match criterion is defined:

$$k^*=\mathrm{argmin}\{\mathrm{var}(S^{(k)}-T)+\alpha E(|S^{(k)}-T|)\}, \qquad (6)$$

where var and E denote variance and expectation operators, respectively. α is a value that weights the expectation operator. For example, α=1 can be used for implementing this method. Based on the above match criterion, a fourth intensity shift estimator $s_4$(x) can be expressed as:

$$s_4(x)=E(T-S^{(k^*)}), \text{ with expectation over the x direction.} \qquad (7)$$

Although additional intensity shift estimators can be designed and integrated into the MH-HMM framework, the present inventors observed that the four intensity shift estimators described above may be sufficient.

Returning to FIG. 1, at step 108, confidence measures are calculated for each of the intensity shift estimators. The confidence measures for the intensity shift estimators can be calculated based on texture analysis of the X-ray image. Because the confidence measures are measures of relative importance among different estimators, the confidence measure of the first estimator $Z_1$ can be set as 1. The confidence measure for the second estimator $\chi_2$ can be designed according to h−$n_d$ in Eq. (4). For example, $\chi_2$=c>1 if h−$n_d$<h−$n_u$, $\chi_2$=1/c otherwise. Here, c is a constant indicating how much more confidence is applied if h−$n_d$<h−$n_u$, i.e., for the estimator resulting from the near-side of the butting line.

Apparent artifacts may be generated if an interpolation based estimator, such as the third estimator, is applied to structural textures of the image. However, when the two sides of the butting region require a smooth transition in between, non-interpolation based estimators may not be suitable. Based on this observation, confidence measures must be calculated that accurately distinguish these textures. For a smooth transition across the butting region, the intensity variance in the neighborhood of the butting region is generally small. Therefore, the confidence measure $\chi_3$ for using an interpolation based estimator should be inversely proportional to the variance of the neighboring intensities. If the neighborhood of the pixel f(x,h) is denoted as N(f(x,h)), then $\chi_3$, the confidence interval for the third estimator $s_3$(x,h), can be calculated as $\chi_3$=$M_3$(var(N(f(x,h)))), where $M_3$ is a mapping function that is designed based on the image data.

Figure 3:
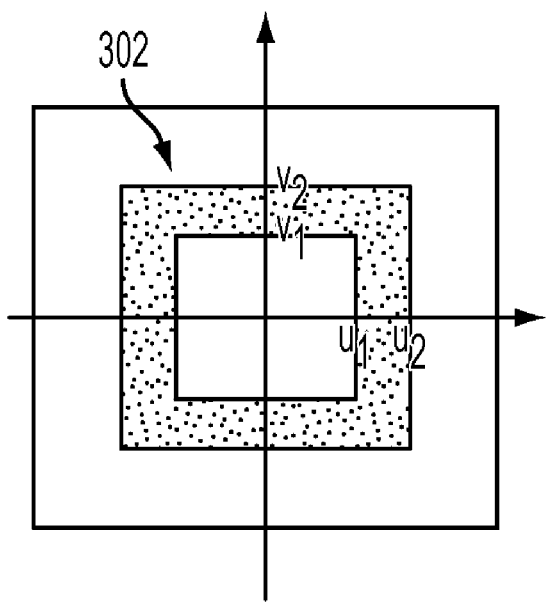
FIG. 3 illustrates the Fourier spectrum of a window centered at a butting pixel.

Textures that contain image structures are usually mid-frequency band signals. Therefore, the confidence measure $\chi_4$ for the fourth estimator $s_4$(x) is based on the normalized mid-band energy. In particular, let $S_N$ denote the normalized Fourier spectrum of N(f(x,h)), with $\Sigma S_N$(u,v)|=1 for all u and v. Then, $\chi_4$=$M_4$($\Sigma_{Mid}$), where $\Sigma_{Mid}$=$\Sigma|S_N$(u,v)| with |u|<$u_2$ and $|v|<v_2$, but excluding $|u|u1$ and $|v|<v1$. FIG. 3 illustrates the Fourier spectrum $S_N$ of a window centered at a butting pixel. As illustrated in FIG. 3, graphically, $\Sigma_{Mid}$ is sum of the total energy over the shaded region 302 of $S_N$. According to a possible implementation, simple step functions for $M_3$ and $M_4$ are sufficient to obtain good results. For example, if $\Sigma_{Mid}>0.5$, the confidence measure for the fourth estimator can be set as $\chi_4=100$ (high confidence), and as $\chi_4=0.01$ (little confidence) otherwise.

Returning to FIG. 1, at step 110, the intensity shift for each pixel along each butting line in the butting artifact region is determined by solving a multiple hypothesis hidden Markov model (MH-HMM) formulated using the intensity shift estimators and confidence intervals subject to a smoothing constraint. The MH-HMM can be solved using the well-known Viterbi algorithm. In order to formulate the MH-HMM, the X-ray image is associated with a distribution model, based on which observation probabilities are calculated. This model and the knowledge that the intensity shift is generally smooth except for the intensity variations at high contrast regions are exploited by the MH-HMM.

Figure 4:
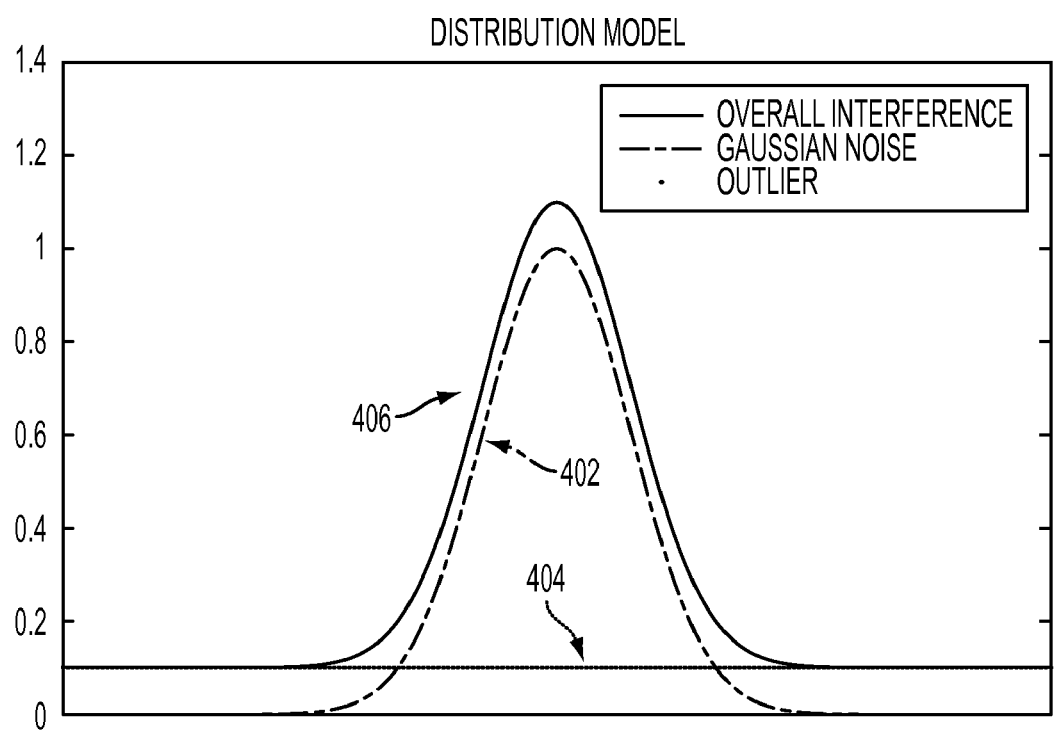
FIG. 4 illustrates an exemplary distribution model for noise and outlier distributions.
Figure 6A:
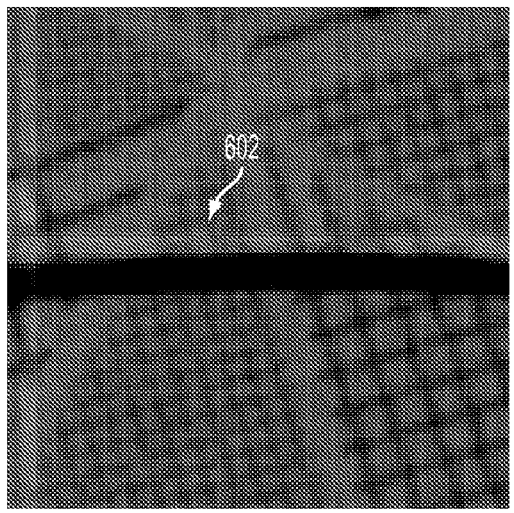
FIG. 6 illustrate exemplary results of correcting a horizontal butting artifact using the method of FIG. 1.
Figure 6B:
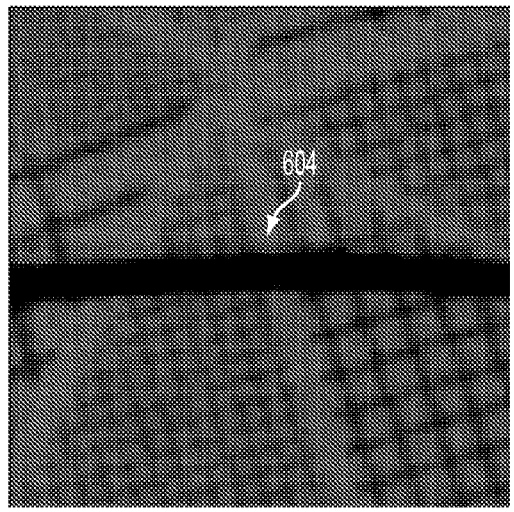
Figure 6C:
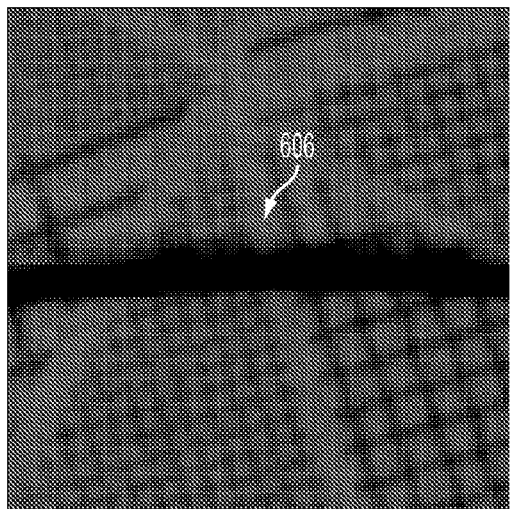
Figure 6D:
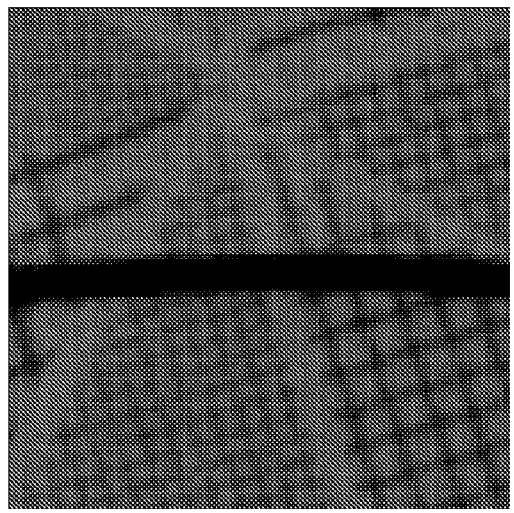

The initial intensity shift $s_i(x,h)$ for each pixel in a butting line is a sum of two random variables and an unknown constant:

$$s_i(x,h)=s(x,h)+n+o, \quad (8)$$

where $s(x,h)$ is the unknown shift; and n and o represent the noise and outlier (image structures), respectively. In X-ray imaging, n can be assumed Gaussian distributed. Without any prior information about the image structure, o can be assumed to be uniformly distributed. FIG. 4 illustrates an exemplary distribution model for the noise and outlier. As illustrated in FIG. 4, the noise distribution 402 is a Gaussian distribution, the outlier distribution 404 is a uniform distribution, and the overall interference distribution 406 is the sum of the noise distribution 402 and the outlier distribution 404.

The intensity shift should be locally smooth along the butting line. Based on this knowledge and the statistical model accounting for noise and image structures. An HMM can be used to find a solution for the intensity shift $s(x,h)$ for each pixel along the butting line. In this HMM problem, the hidden states are the intensity shifts $s(x,h)$ to be estimated because they cannot be directly observed and are corrupted by imaging noise and image content. However, initial intensity shift estimates $s_i(x,h)$, i=1, 2, 3, and 4 can be calculated using the intensity shift estimators described above. A state transition matrix is used in order to enforce a smoothness constraint between the shift estimates for pixels along the butting line. For example, a Gaussian function can be chosen to determine the transition probability between intensity shift estimates of neighboring pixels. Such a Gaussian transition probability can be expressed as:

$$P(s(x+1,h)|s(x,h)) = \frac{1}{\sqrt{2\pi}\,\sigma(x)} e^{-\frac{(s(x+1,h)-s(x,h))^2}{2\sigma(x)^2}}, \quad (9)$$

where the standard deviation $\sigma(x)$ determines the strength of the smoothness constraint. This value is designed to be inversely proportional to the gradient strength of the image. For very high edge strength, $\sigma$ can be set to infinity, thus relaxing the smoothness constraint. With the MH-HMM formulated based on the initial intensity shift estimates and the transition probabilities, the Viterbi algorithm is used to determine the maximum a posterior solution for the MH-HMM.

The Viterbi algorithm inspects all the pixels along the artifact line and finds the global optimal solution in the sense of maximizing the posterior probability given observation and state transition models. FIG. 5 illustrates pseudo-code for using the Viterbi algorithm to solve the MH-HMM. In the Viterbi algorithm of FIG. 5, N states are used to represent the possible intensity shifts for a pixel and the length of the artifact line is T. As illustrated in FIG. 5, the Viterbi algorithm performs the steps of Initialization (step 502), recursion (step 504), Optimal solution calculation (step 506), and path (state sequence) backtracking (step 508).

In the initialization step (502), $P_i(s_0(1,h))$ is the probability of the first observation being $s_0(1,h)$ given the first pixel being at state i, computed according to the distribution model (FIG. 4). $\Phi_x(i)$ denotes the most likely state for the previous pixel (x−1) given that the current pixel (x) is at state i. $\delta_x(i)$ is the maximum probability of pixel x at state i given the previous path. Accordingly, the state of the first pixel is initialized as shown in step 502.

In the recursion step (504), the Viterbi algorithm recursively evaluates the probabilities of all possible paths and finds the optimal state with maximum probability for each pixel and records the probability and the states along the path. In this step, $a_{ij}$ is the transition probability from state i to state j, computed according to Eq. (8) between consecutive pixels, and acts as a smoothness constraint. $\chi_k(x)$ for the intensity shift $s_k(x,h)$.

In the optimal solution (max a posteriori) step (506), the Viterbi algorithm evaluates all possible states for the last pixel and determines an optimal solution by finding the state with the maximum probability. At the path (state sequence) backtracking step (508), the algorithm backtracks through the selected sequence of states to retrieve the MAP states that were previously recorded in the recursion step.

The Viterbi algorithm solves the MH-HMM problem, resulting in a sequence of states corresponding to the pixels along the artifact line, where each state is a intensity shift value of the corresponding pixel.

Returning to FIG. 1, at step 112, an intensity is determined for each pixel along the butting artifact line. In particular, the intensity is determined for each pixel by shift the original intensity of the pixel in the received image by the intensity shift determined for the pixel by solving the MH-HMM. This results in a corrected x-ray image, in which the butting artifact is corrected.

At step 114, inverse normalization is performed on artifact region of the corrected x-ray image. Inverse normalization is performed on the artifact region in order to undo the normalization of step 104, so that the artifact region of the corrected x-ray image matches the rest of the image.

At step 116, the corrected x-ray image is output. The corrected x-ray image can be output be displaying the corrected image, for example using a display device of a computer system. It is also possible to output the corrected x-ray image by printing the corrected x-ray image or storing the corrected x-ray image in a computer system's storage or memory, or other computer readable medium.

As described above, the method of FIG. 1 describes correcting a horizontal butting artifact. The horizontal butting artifact may have multiple artifact lines, and in this case a separate MH-HMM is formulated and solved for each artifact line. Further, in cases where a butting cross, consisting of a horizontal butting artifact and a vertical artifact, exist in an x-ray image, the butting cross can be corrected by first correcting the horizontal butting artifact using the method of FIG. 1, and then rotating the x-ray image 90 degrees and correcting the vertical (before rotation) artifact using the method of FIG. 1.

FIG. 6 illustrate exemplary results of correcting a horizontal butting artifact using the method of FIG. 1. As illustrated in FIG. 6, image (a) is an original x-ray image with a horizontal butting artifact 602. Image (b) shows butting artifact correction results using on the first estimator. Image (c) shows butting artifact correction results using only the third estimator. Image (d) shows butting artifact correction results using all four of the estimators described above. FIG. 6 illustrates why multiple estimators are advantageous. In this example, a black line (structure) is aligned with the bottom side of the butting region as shown in image (a). If an estimator based on the bottom side of the butting region is used, the bottom portion of the butting lines won't be corrected appropriately because the intensity adjustment for this region should be based on the top side of the butting region. Accordingly, as shown in image (b), when only the first estimator is used for artifact correction, an artifact 604 remains in the corrected image. Similarly, as shown in image (c), when only the third estimator, an artifact 606, remains in the corrected image. As shown, in image (d), when all estimators are used, the artifact correction is more successful. This is because the MH-HMM can select the estimator that results in a higher probability, i.e. the estimator that gives the most likely intensity shift transition given the imposed smoothness constraint.

FIGS. 7 and 8 illustrate exemplary butting cross artifact correction results using the method of FIG. 1. As illustrated in FIG. 7, image (a) is an original x-ray image having a butting cross artifact 702 that runs across different textures and structures, e.g. grids of different spatial frequency and the letter 0. Image (b) is a corrected image in which the butting cross artifact in image (a) has been corrected and the different textures and structures are preserved. As illustrated in FIG. 8, image (a) is an original x-ray image containing high-frequency grid structures and having a butting cross artifact 802. Image (b) is a corrected image in which the butting cross has been corrected and the high-frequency grid structure is preserved.

Figure 9:
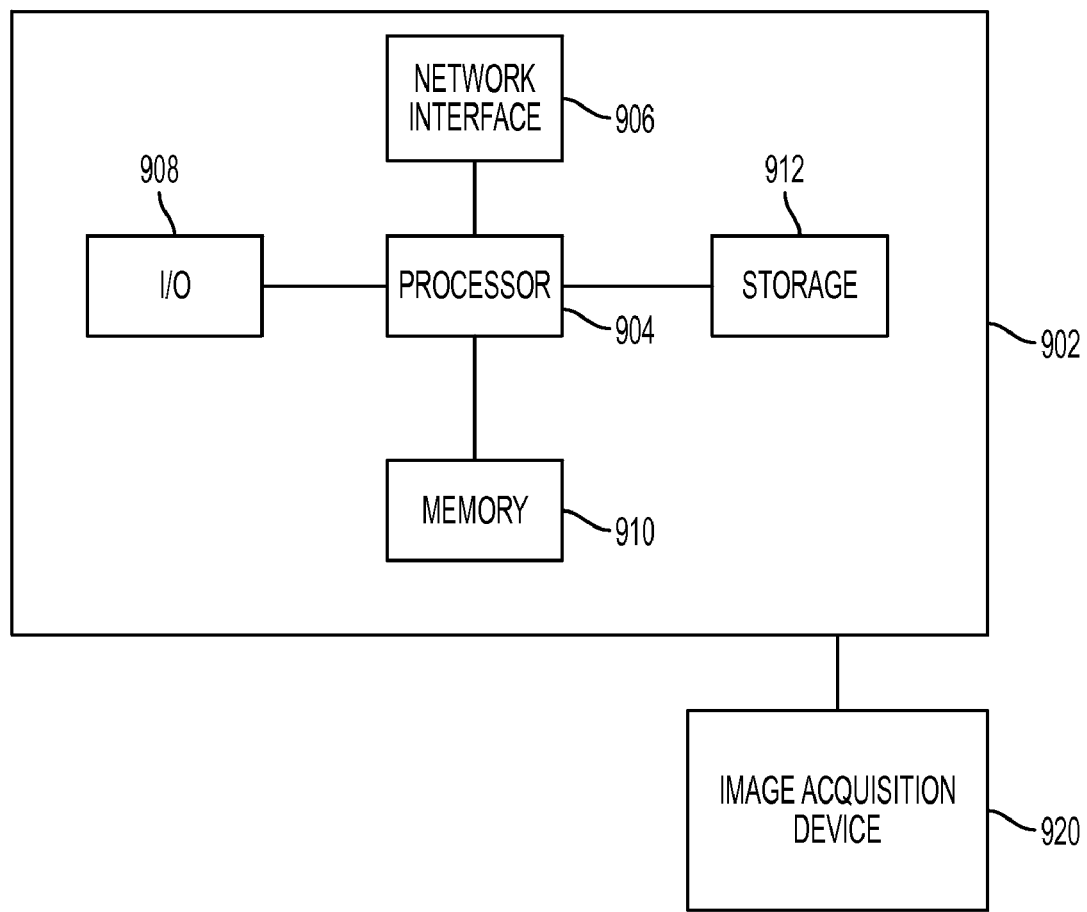
FIG. 9 is a high level block diagram of a computer capable of implementing the present invention.

The above-described methods for correcting butting artifacts in an X-ray image may be implemented on a computer using well-known computer processors, memory units, storage devices, computer software, and other components. A high level block diagram of such a computer is illustrated in FIG. 9. Computer 902 contains a processor 904 which controls the overall operation of the computer 902 by executing computer program instructions which define such operation. The computer program instructions may be stored in a storage device 912 (e.g., magnetic disk) and loaded into memory 910 when execution of the computer program instructions is desired. Thus, all method steps described above for method of correcting butting artifacts in an X-ray image, including the method steps illustrated in FIG. 1 and the steps of the algorithm illustrated in FIG. 8, may be defined by the computer program instructions stored in the memory 910 and/or storage 912, or other computer readable medium, and controlled by the processor 904 executing the computer program instructions. An image acquisition device 920, such as an X-ray imaging device, can be connected to the computer 902 to input images to the computer 902. It is possible to implement the image acquisition device 920 and the computer 902 as one device. It is also possible that the image acquisition device 920 and the computer 902 communicate wirelessly through a network. The computer 902 also includes one or more network interfaces 906 for communicating with other devices via a network. The computer 902 also includes other input/output devices 908 that enable user interaction with the computer 902 (e.g., display, keyboard, mouse, speakers, buttons, etc.) One skilled in the art will recognize that an implementation of an actual computer could contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for correcting a butting artifact in an x-ray image comprising:
    receiving an x-ray image having a butting artifact, the butting artifact including one or more lines of pixels;
    calculating multiple intensity shift estimators for each pixel of each line of the butting artifact;
    calculating a confidence measure for each of the multiple intensity shift estimators;
    determining an intensity shift value for each pixel of each line of the butting artifact using a multiple hypothesis hidden Markov model (MH-HMM) formulated based on the intensity shift estimators and the confidence intervals subject to a smoothness constraint; and
    generating a corrected image by adjusting an intensity of each pixel of each line of the butting artifact in the x-ray image based on the intensity shift value determined for that pixel.

2. The method of claim 1, further comprising:
    normalizing a region surrounding the butting artifact in the x-ray image prior to said step of calculating multiple intensity shift operators.

3. The method of claim 2, further comprising:
    inversely normalizing the region surrounding the butting artifact in the corrected image.

4. The method of claim 1, wherein said step of calculating multiple intensity shift estimators for each pixel of each line of the butting artifact comprises:
    calculating a first intensity shift operator based on intensities of pixels in the x-ray image neighboring the butting artifact above the butting artifact; and
    calculating a second intensity shift operator based on intensities of pixels in the x-ray image neighboring the butting artifact below the butting artifact.

5. The method of claim 4, wherein said step of calculating multiple intensity shift estimators for each pixel of each line of the butting artifact further comprises:
    calculating a third intensity shift operator based on interpolated intensities of pixels in the x-ray image neighboring the butting artifact above and below the butting artifact.

6. The method of claim 5, wherein said step of calculating multiple intensity shift estimators for each pixel of each line of the butting artifact further comprises:
    calculating a fourth intensity shift operator based on similarity between a template window within a region surrounding the butting artifact and a sliding window in a defined search window of the x-ray image.

7. The method of claim 6, wherein said step of calculating a confidence measure for each of the multiple intensity shift estimators comprises:
calculating first and second confidence measures for the first and second intensity shift estimators, respectively, based on texture analysis of the x-ray image;
calculating a third confidence interval for the third intensity shift estimator based on a variance of intensities of neighboring pixels; and
calculating a fourth confidence interval for the fourth intensity shift estimator based on a mid-band energy of a Fourier spectrum of neighboring pixels.

8. The method of claim 1, wherein said step of determining an intensity shift value for each pixel of each line of the butting artifact using a multiple hypothesis hidden Markov model (MH-HMM) formulated based on the intensity shift estimators and the confidence intervals subject to a smoothness constraint comprises:
determining the intensity shift values for each pixel of each line of the butting artifact by solving the MH-HMM using a Viterbi algorithm.

9. The method of claim 1, wherein hidden states of the MH-HMM are the intensity shift values, and a state transition matrix is used to enforce the smoothness constraint between intensity shift value for consecutive pixels along a line of the butting artifact.

10. The method of claim 1, wherein the butting artifact includes multiple pixels and said step of determining an intensity shift value for each pixel of each line of the butting artifact using a multiple hypothesis hidden Markov model (MH-HMM) formulated based on the intensity shift estimators and the confidence intervals subject to a smoothness constraint comprises:
solving a separate MH-HMM for each of the multiple lines of the butting artifact.

11. The method of claim 1, wherein said butting artifact is a horizontal butting artifact and said x-ray image also has a vertical butting artifact, further comprising:
rotating said corrected image such that said vertical butting artifact is horizontal; and
repeating said calculating, calculating, determining, and generating steps to correct said vertical butting artifact.

12. An apparatus for correcting a butting artifact in an x-ray image comprising:
means receiving an x-ray image having a butting artifact, the butting artifact including one or more lines of pixels;
means for calculating multiple intensity shift estimators for each pixel of each line of the butting artifact;
means for calculating a confidence measure for each of the multiple intensity shift estimators;
means for determining an intensity shift value for each pixel of each line of the butting artifact using a multiple hypothesis hidden Markov model (MH-HMM) formulated based on the intensity shift estimators and the confidence intervals subject to a smoothness constraint; and
means for generating a corrected image by adjusting an intensity of each pixel of each line of the butting artifact in the x-ray image based on the intensity shift value determined for that pixel.

13. The apparatus of claim 12, further comprising:
means for normalizing a region surrounding the butting artifact in the x-ray image prior to said step of calculating multiple intensity shift operators; and
means for inversely normalizing the region surrounding the butting artifact in the corrected image.

14. The apparatus of claim 12, wherein said means for calculating multiple intensity shift estimators for each pixel of each line of the butting artifact comprises:
means for calculating a first intensity shift operator based on intensities of pixels in the x-ray image neighboring the butting artifact above the butting artifact;
means for calculating a second intensity shift operator based on intensities of pixels in the x-ray image neighboring the butting artifact below the butting artifact;
means for calculating a third intensity shift operator based on interpolated intensities of pixels in the x-ray image neighboring the butting artifact above and below the butting artifact; and
calculating a fourth intensity shift operator based on similarity between a template window within a region surrounding the butting artifact and a sliding window in a defined search window of the x-ray image.

15. The apparatus of claim 14, wherein said means for calculating a confidence measure for each of the multiple intensity shift estimators comprises:
means for calculating first and second confidence measures for the first and second intensity shift estimators, respectively, based on texture analysis of the x-ray image;
means for calculating a third confidence interval for the third intensity shift estimator based on a variance of intensities of neighboring pixels; and
means for calculating a fourth confidence interval for the fourth intensity shift estimator based on a mid-band energy of a Fourier spectrum of neighboring pixels.

16. The apparatus of claim 12, wherein said means for determining an intensity shift value for each pixel of each line of the butting artifact using a multiple hypothesis hidden Markov model (MH-HMM) formulated based on the intensity shift estimators and the confidence intervals subject to a smoothness constraint comprises:
means for determining the intensity shift values for each pixel of each line of the butting artifact by solving the MH-HMM using a Viterbi algorithm.

17. The apparatus of claim 12, wherein hidden states of the MH-HMM are the intensity shift values, and a state transition matrix is used to enforce the smoothness constraint between intensity shift value for consecutive pixels along a line of the butting artifact.

18. A non-transitory computer readable medium encoded with computer executable instructions for correcting a butting artifact in an x-ray image, the computer executable instructions defining steps comprising:
receiving an x-ray image having a butting artifact, the butting artifact including one or more lines of pixels;
calculating multiple intensity shift estimators for each pixel of each line of the butting artifact;
calculating a confidence measure for each of the multiple intensity shift estimators;
determining an intensity shift value for each pixel of each line of the butting artifact using a multiple hypothesis hidden Markov model (MH-HMM) formulated based on the intensity shift estimators and the confidence intervals subject to a smoothness constraint; and
generating a corrected image by adjusting an intensity of each pixel of each line of the butting artifact in the x-ray image based on the intensity shift value determined for that pixel.

19. The non-transitory computer readable medium of claim 18, further comprising computer executable instructions defining the steps of:

normalizing a region surrounding the butting artifact in the x-ray image prior to said step of calculating multiple intensity shift operators; and inversely normalizing the region surrounding the butting artifact in the corrected image.

20. The non-transitory computer readable medium of claim 18, wherein the computer executable instructions defining the step of calculating multiple intensity shift estimators for each pixel of each line of the butting artifact comprise computer executable instructions defining the steps of:

calculating a first intensity shift operator based on intensities of pixels in the x-ray image neighboring the butting artifact above the butting artifact; and calculating a second intensity shift operator based on intensities of pixels in the x-ray image neighboring the butting artifact below the butting artifact;

calculating a third intensity shift operator based on interpolated intensities of pixels in the x-ray image neighboring the butting artifact above and below the butting artifact; and calculating a fourth intensity shift operator based on similarity between a template window within a region surrounding the butting artifact and a sliding window in a defined search window of the x-ray image.

21. The non-transitory computer readable medium of claim 20, wherein the computer executable instructions defining the step of calculating a confidence measure for each of the multiple intensity shift estimators comprise computer executable instructions defining the steps of:

calculating first and second confidence measures for the first and second intensity shift estimators, respectively, based on texture analysis of the x-ray image;

calculating a third confidence interval for the third intensity shift estimator based on a variance of intensities of neighboring pixels; and calculating a fourth confidence interval for the fourth intensity shift estimator based on a mid-band energy of a Fourier spectrum of neighboring pixels.

22. The non-transitory computer readable medium of claim 18, wherein the computer executable instructions defining the step of determining an intensity shift value for each pixel of each line of the butting artifact using a multiple hypothesis hidden Markov model (MH-HMM) formulated based on the intensity shift estimators and the confidence intervals subject to a smoothness constraint comprise computer executable instructions defining the step of:

determining the intensity shift values for each pixel of each line of the butting artifact by solving the MH-HMM using a Viterbi algorithm.

23. The non-transitory computer readable medium of claim 18, wherein hidden states of the MH-HMM are the intensity shift values, and a state transition matrix is used to enforce the smoothness constraint between intensity shift value for consecutive pixels along a line of the butting artifact.

24. The non-transitory computer readable medium of claim 18, wherein the butting artifact includes multiple pixels and the computer executable instructions defining the step of determining an intensity shift value for each pixel of each line of the butting artifact using a multiple hypothesis hidden Markov model (MH-HMM) formulated based on the intensity shift estimators and the confidence intervals subject to a smoothness constraint comprise computer executable instructions defining the step of:

solving a separate MH-HMM for each of the multiple lines of the butting artifact.

25. The non-transitory computer readable medium of claim 18, wherein said butting artifact is a horizontal butting artifact and said x-ray image also has a vertical butting artifact, further comprising computer executable instructions defining the steps of:

rotating said corrected image such that said vertical butting artifact is horizontal; and repeating said calculating, calculating, determining, and generating steps to correct said vertical butting artifact.

* * * * *